(12) United States Patent
Rouchaud et al.

(10) Patent No.: US 9,293,867 B2
(45) Date of Patent: Mar. 22, 2016

(54) CABLE PORTION INCLUDING A COUPLING DEVICE FOR CONNECTING SUBSCRIBER LINES TO A DATABUS LINE

(75) Inventors: Gilles Rouchaud, Montmirail (FR); Christophe Coffinet, Conde en Brie (FR)

(73) Assignee: Axon Cable, Montmirail (FR)

( * ) Notice: Subject to any disclaimer, the term of this patent is extended or adjusted under 35 U.S.C. 154(b) by 0 days.

(21) Appl. No.: 14/130,807

(22) PCT Filed: Jul. 3, 2012

(86) PCT No.: PCT/FR2012/051537
§ 371 (c)(1),
(2), (4) Date: Apr. 14, 2014

(87) PCT Pub. No.: WO2013/004963
PCT Pub. Date: Jan. 10, 2013

(65) Prior Publication Data
US 2014/0302712 A1    Oct. 9, 2014

(30) Foreign Application Priority Data
Jul. 4, 2011   (FR) ...................... 11 56014

(51) Int. Cl.
H01R 13/6592 (2011.01)
H01R 13/66 (2006.01)
(Continued)

(52) U.S. Cl.
CPC ........ *H01R 13/6592* (2013.01); *H01R 13/6658* (2013.01); *H01R 13/73* (2013.01); *H01R 24/54* (2013.01); *H01R 31/005* (2013.01); *H04L 12/40013* (2013.01); *H01R 9/032* (2013.01)

(58) Field of Classification Search
CPC ......................... H01R 13/648; H01R 13/6592
USPC ........................... 439/607.01, 607.34, 607.31
See application file for complete search history.

(56) References Cited

U.S. PATENT DOCUMENTS 4,038,601 A * 7/1977 Laborie et al. ................ 375/219
5,906,513 A   5/1999 Peterson et al.
(Continued)

FOREIGN PATENT DOCUMENTS

EP   0 241 738 A2   10/1987
FR   2 261 667 A1    9/1975
(Continued)

OTHER PUBLICATIONS

International Search Report and Written Opinion of PCT/FR2012/051537 dated Sep. 3, 2012.
(Continued)

*Primary Examiner* — Chandrika Prasad
(74) *Attorney, Agent, or Firm* — Miles & Stockbridge P.C.

(57) ABSTRACT

A cable portion comprising a databus line (54) having one or more subscriber lines (52) connected thereto by a coupler device. The databus line and the subscriber line(s) each comprise a twisted pair of conductors protected by shielding. The coupler device comprises a coupler (53) providing data transmission between the two parts of the databus line and between the databus line and the subscriber line(s), and connectors (56A, 56B, 58) serve to connect the databus line with the subscriber line(s) in reversible manner. The coupler device presents weight of less than 70 g and is held by means of a fastener collar that enables the cable portion to be put into place in particularly practical manner in order to constitute a data transmission circuit.

16 Claims, 4 Drawing Sheets

(51) Int. Cl.
*H01R 24/54* (2011.01)
*H01R 31/00* (2006.01)
*H04L 12/40* (2006.01)
*H01R 13/73* (2006.01)
*H01R 9/03* (2006.01)

(56) References Cited

U.S. PATENT DOCUMENTS

| | | | | |
|---|---|---|---|---|
| 6,109,971 | A * | 8/2000 | Vadlakonda | 439/620.03 |
| 6,314,481 | B1 | 11/2001 | Fehlhaber | |
| 2004/0157493 | A1 * | 8/2004 | Bergner et al. | 439/610 |
| 2006/0278794 | A1 | 12/2006 | Rast | |

FOREIGN PATENT DOCUMENTS

| | | |
|---|---|---|
| JP | 6-44271 | 6/1994 |
| JP | 6-208857 | 7/1994 |
| JP | 9-115604 | 5/1995 |
| JP | 2001-319721 | 11/2001 |

OTHER PUBLICATIONS

Office Action for related Japanese Application No. 2014-517897, mailed Nov. 17, 2015.

* cited by examiner

CABLE PORTION INCLUDING A COUPLING DEVICE FOR CONNECTING SUBSCRIBER LINES TO A DATABUS LINE

The invention relates to connection equipment comprising a coupler device for a databus line, in particular for a line complying with the requirements of American standard MIL-STD-1553B.

The standard MIL-STD-1553B is a standard written for military applications, defining electrical and functional characteristics for a serial databus network that is to be used for transferring information between pieces of equipment in a vehicle. That standard was originally devised for military purposes and in particular for military avionics, however it is also commonly used in the field of space, and has recently begun to be used in civil aviation because of its great reliability.

FIG. 1 shows a known embodiment of a databus network 10 in compliance with the standard MIL-STD-1553B. That databus line is designed to be incorporated in a cable bundle or harness forming part of a vehicle such as an airplane, a satellite, etc.

The databus network 10 satisfying that standard is characterized by a main line 12 or databus line that is generally provided in redundant manner, for the purpose of conveying the data stream, and to which lines 18 referred to as "stubs" or as "subscriber lines" are connected via coupler devices 14 and 16.

In the present document, the term "line" is used to designate any wire or cable suitable for conveying at least one signal; the term "part of a databus line" is used to designate a line part suitable for forming part of a databus line; the term "subscriber line part" is used to designate a line part suitable for forming part of a subscriber line connecting a piece of equipment to a databus line.

In the network 10, the subscriber lines 18 connect the databus line 12 to pieces of equipment (not shown) that need to communicate, which pieces of equipment are connected to the subscriber lines via end connectors 20. The main line 12 is terminated by two line terminating impedances 22 positioned at each of the ends of the line 12. In the example of FIG. 1, the couplers serve either to connect a single subscriber line (coupler devices 14), or else to connect two subscriber lines (coupler device 16 for coupling two subscriber lines).

The main line and the subscriber lines are shielded twisted pairs matched to an impedance of 77 ohms ($\Omega$).

In that network, the various parts of the databus line 12 are permanently fastened to the coupler devices 14, 16. Likewise, the subscriber lines 18 are permanently fastened to the coupler devices 14, 16. The assembly shown in FIG. 1 is thus a complete harness that is put together in a factory, and it can neither be disassembled nor reorganized as a function of unexpected circumstances occurring while being fitted to a vehicle. No modification can be made by the operators in charge of fitting it. Thus, that solution can be burdensome or even very burdensome in the event of maintenance, of changing the topology (architecture) of the databus network, e.g. when it is necessary to add a coupler device as a result of incorporating a new piece of equipment, or merely as a result of a difficulty occurring during fitting (e.g. a cable or a coupler device being damaged while being installed in the vehicle). In addition, in order to specify that type of harness and have it fabricated, the arrangement and the shape of the vehicle needs to be fully known (locations of the coupler devices, lengths of the lines), which is very constraining on an industrial scale.

Finally, the harness must be complete on being fabricated in a factory, which means that is generally very bulky and difficult to handle.

Another known solution for making a databus network in compliance with the standard MIL-STD-1553B consists in using a coupler arranged in a connection housing. This is then referred to as a coupler housing. Connectors are fastened on a face of the housing to enable the databus line and the subscriber line(s) to be connected thereto. Screws are generally used for fastening the relatively heavy connection housing to the structure in which the databus network is installed, generally on board a vehicle. Fastening by means of screws is tried and tested, and is known to be reliable in spite of the stresses (accelerations, vibration, impacts) that may arise in the vehicle.

By means of the coupler housings, the databus network may advantageously be installed progressively, in modular manner. It is possible to purchase the couplers and the interface connectors as standard "off-the-shelf" elements, and to have the subscriber lines made up by a cabling workshop. Thus, the subscriber lines are adapted to the application for which they are made, and they can be modified at any time. That solution offers the possibility of making maintenance easy.

Nevertheless, because of the weight of the couplers, the databus network made in that way is heavy, and in particular it is much heavier than the previously-described embodiment. Furthermore, the couplers are fastened to the structure of the vehicle, thereby weakening it. Furthermore, the fastener holes in the vehicle structure need to be subjected to thorough study, and in general they need to be validated at the time the vehicle is designed, which represents a significant industrial constraint. Finally, the topology of the bus network must be known from the beginning of the project, which is rarely possible.

A third known solution is that disclosed by patent EP 0 241 738. That patent discloses a coupler device for a databus network in compliance with the standard MIL-STD-1553B. That coupler device comprises a housing in two portions, namely a front portion in the form of a sleeve and a chamber. The front portion has a flange, whereby the coupler is fastened in an electrical cabinet. The electrical cabinet is itself fastened to the structure of the vehicle.

Because of the size and the weight of such an electrical cabinet, the number of electrical cabinets in a vehicle must be limited. That embodiment thus leads to having relatively long distances between the pieces of equipment for connection to the data bus and the points where they are connected thereto, inside an electrical cabinet. That leads to poorer quality in the signals that are transmitted, to greater weight for the databus network, and to the need for fastening the electrical cabinet containing the connection housings.

Thus, a first object of the invention is to remedy the drawback of prior devices and to propose connection equipment for a databus line that is arranged in such a manner that the databus line can be incorporated in the databus network in modular manner, e.g. making it possible to change the subscriber line(s), to change or add a coupler device, etc.

A second object of the invention is for the connection equipment, in spite of the above-mentioned facilities for changing subscriber lines, to present relatively low weight and in particular weight that is smaller than equivalent elements (in particular comprising coupler housings) that are already in existence.

A third object is for the connection equipment to have no need of fastening means that harm the structure of the vehicle in which the databus network is mounted.

A fourth object is for the connection equipment to be capable of being installed in a structure, in particular a vehicle, without requiring feasibility studies and without requiring any modification to the structure in which the databus network is to be implanted.

These objects are achieved by the fact that the connection equipment consists in a cable portion comprising:

two parts of a databus line;
at least one subscriber line part; and
a coupler device to which said databus line and subscriber line(s) parts are connected;
the databus line and the at least one subscriber line each comprising a twisted pair of conductors protected by shielding;
the coupler device comprising:
in a conductive housing, a coupler for transmitting data between the two parts of the databus line, and also between the databus line and said at least one subscriber line; and
connectors secured to the housing, enabling the two parts of said databus line and said at least one subscriber line to be reversibly connected thereto;
the housing being electrically connected to the shielding of said two parts and of said at least one subscriber line; and
the coupler device having weight of less than 70 grams (g) and being held with the help of a fastener collar.

Naturally, the lighter the coupler device, the simpler it is to fasten. In one embodiment, weight of the coupler device is less than 50 g or even 30 g, in particular when the couplers are designed for connecting a single subscriber line only.

Such a reduction in weight is made possible in particular by using connectors and a device that are miniaturized. In particular, it is appropriate to use electronic components (for the coupler), a housing, and connectors of size that is as small as possible in order to reduce the dimensions and the weight of the coupler device.

Because of the lightness of the coupler device, the question of fastening the coupler device and holding it in position arises in a manner that is completely different compared with the above-described prior equipment.

In prior harnesses, each time connectors are integrated in the coupler in order to disconnect and reconnect subscriber lines, that requires the use of metal boxes that are relatively heavy. The weight of those boxes is such that they need to be fastened to the structure in which the harness is installed (e.g. a wall of the vehicle) by means of screws, the only means known for ensuring the required reliability of their support.

In contrast, by means of the invention, the lighter coupling device makes it possible to envisage new techniques for supporting it. In particular, the invention makes it possible to fasten the coupler device very simply with the help of a mere fastener collar. The coupler device is light enough to enable it to be fastened without any need to use screws, rivets, or any other fastener means requiring a hole to be made in the structure containing the cable portion.

It should be observed that in this document, the term "fastener collar" designates broadly any part or set of parts that may be flexible, relatively flexible, or even rigid (providing it can be deformed while it is being put into place, as is possible with a part including a hinge), and suitable for being used to surround one or more different components and thus hold them together—e.g. in order to hold the coupler device in position on other lines of the cable portion—.

A fastener collar may thus be a self-locking collar of the "tie-wrap" type, or of the "freight-wire" type as used in aviation, a tape, in particular an adhesive tape optionally wound several times around the components to be held in place, or indeed a prefabricated part adapted to the outside shape of the cable portion and clipped thereon in order to hold it.

In an embodiment, the cable portion comprises at least one other line in addition to the databus line and said at least one subscriber line, and the fastener collar holds together the coupler device and at least one line from said at least one other line. Thus, the coupling device is held in full or in part by one or more other lines of the cable portion. In practice, the fastener collar is usually wound around all of the lines of the cable portion, and serves to hold them together at the same time as the coupler device. Since some of the stresses to which the coupler device is subjected (accelerations, vibration, etc.) are taken up by the other line(s) of the cable portion, that makes it possible to limit any other means that might need to be devoted to holding the coupler device in position.

As mentioned above, the fastener collar surrounds all or some of the lines of the cable portion, and also the coupler device. Under such circumstances, the fastener collar may optionally also surround a support piece external to the cable portion: it then serves to hold the cable portion in position on that support piece.

Nevertheless, it often suffices for the coupler device to be supported mechanically solely by the lines of the cable portion, directly and/or via at least one fastener collar. The term "supported directly" is used herein to mean that the coupler device bears directly against one or more lines of the cable portion (databus network, subscriber line(s), any other lines), and is thus in direct contact therewith, without any other elements being interposed.

It can be understood that under such circumstances, the fastener collar(s) holding the coupler device hold it solely relative to the other lines of the cable portion. Such a collar does not surround any support piece external to the cable portion.

This technique for holding the coupler device is particularly simple; the coupler device is advantageously held in position solely with the help of the lines of the cable portion, without using any screws or any other fastener means that are intrusive relative to the structure (i.e. that penetrate into the structure).

In an embodiment, the cable portion also includes a rigid support onto which the coupler device is fastened by at least one fastener collar. The rigid support serves to improve the holding of the coupler device relative to the other lines of the cable portion, and/or relative to an external support piece against which the cable portion bears.

It can be understood that in certain embodiments, the coupler device is also pressed against and possibly adhesively bonded to a support piece (or possibly fastened with an adhesive tape, which amounts to indirect adhesive bonding), which support piece is external to the cable portion and contributes to holding the coupler device in position. When the cable portion is mounted in a vehicle, the support piece is generally a piece of the vehicle structure.

An embodiment of the invention thus consists in communications equipment comprising a cable portion as defined above and a support piece external to the cable portion, the coupler device being mechanically supported by bearing against or by being adhesively bonded to said support piece.

In a variant of this communications equipment, the cable portion has a rigid support on which the coupler device is fastened by at least one fastener collar, the rigid support being adhesively bonded and/or fastened by an adhesive tape on the support piece.

As can be seen, in all of the embodiments described above, the coupler device can be fastened in particularly simple and fast manner, in particular because it does not require any holes to be drilled or any damage to the integrity of the vehicle in which the data bus is implanted.

Advantageously, the databus line and the subscriber lines (shielded twisted pairs), the coupling devices, the connection terminals enabling the subscriber lines to be connected to the coupler devices, and the other accessories (in particular the line terminators) may be made available as "off-the-shelf" items. Thus, at the time the databus network is being assembled and on the premises where it is being assembled, the operators in charge of wiring can themselves install the subscriber lines and put them into place in the databus network.

Various improvements may be applied to the cable portion of the invention.

In one embodiment, the two parts of the databus line and said at least one subscriber line are connected to the device in parallel with a common direction. This makes it possible to release the surfaces of the housing of the coupler device that face in directions perpendicular to the direction of the lines and that form the side faces of the housing. This makes it possible to pass the fastener collar over those faces in order to hold the coupler device, thereby avoiding problems of obstruction.

Furthermore, in an embodiment, the coupler device includes a printed circuit, at least one transformer arranged on a first side of said printed circuit, and at least one transformer arranged on a second side of said printed circuit, opposite from the first side. This arrangement makes it possible to reduce the volume of the housing of the coupler device.

In another aspect of the invention, the above-mentioned objects can also be achieved by a cable portion comprising:
two parts of a databus line;
at least one subscriber line part;
in some circumstances, at least one other line; and
a coupler device to which said databus line and subscriber line(s) parts are connected;
the databus line and the at least one subscriber line each comprising a twisted pair of conductors protected by shielding;
the coupler device comprising:
in a conductive housing, a coupler for transmitting data between the two parts of the databus line, and also between the databus line and said at least one subscriber line; and
connectors secured to the housing, enabling the two parts of said databus line and said at least one subscriber line to be reversibly connected thereto;
the housing being electrically connected to the shielding of said two parts and of said at least one subscriber line; and
the coupling device weighing less than 70 g, and being mechanically supported solely by the above-mentioned lines, and/or by at least one fastener collar, and/or by bearing against or by being adhesively bonded to at least one element external to the device.

Naturally, under such circumstances, the various above-specified embodiments of the invention, and the fitting of the cable portion within a piece of communications equipment as described above, are equally applicable to the above-defined cable portion.

The invention can be well understood and its advantages appear better on reading the following detailed description of embodiments shown as non-limiting examples. The description refers to the accompanying drawings, in which:

FIGS. 2 and 3 show a coupling device 50 suitable for being used in a cable portion of the invention.

The coupling device 50 is designed to connect a subscriber line 52 to a databus line 54. Naturally, coupling devices of the invention may be capable of connecting a plurality of subscriber lines (e.g. two, three, or four subscriber lines) instead of only one as for the device 50.

The coupling device 50 mainly comprises a coupler 53, a housing 55, and three connectors 56A, 56B, and 58.

In general, in the coupling device of a cable portion of the invention, the conductive housing is a machined metal box, e.g. made of aluminum, and containing the electronic components making up the coupler. The housing is electrically connected with the shielding braids of the two parts of the databus line and also with the subscriber line(s). The connectors secured to the housing make it easy to connect the databus line with the subscriber line(s).

The three connectors 56A, 56B, and 58 correspond to three corresponding connection terminals 60A, 60B, and 62. The connection terminals 60A, 60B, are fastened to the ends of two parts 54A and 54B of the databus line 54, and the terminal 62 is fastened to the end of the subscriber line 52.

The connectors and the connection terminals are micro-connectors, of dimensions that are very small, having an outside diameter of less than 4 millimeters (mm), of the order of 3 mm.

Figure 3:
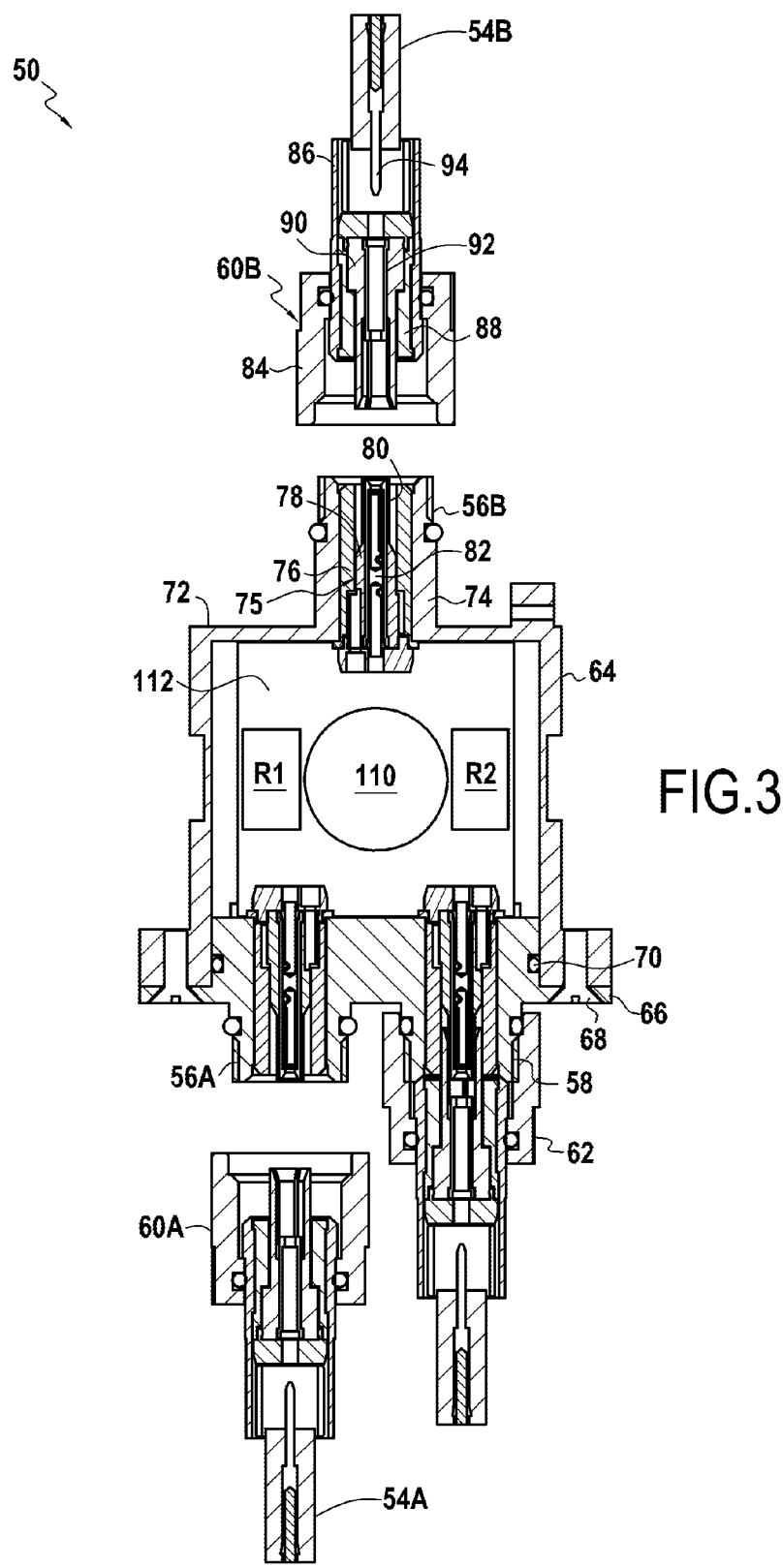
FIG. 3 is a diagrammatic section of the FIG. 2 coupling device.

The housing 55 is generally in the form of a rectangular parallelepiped. It is made by casting aluminum and machining it. It is constituted by a shell 64 forming five of the six faces of the housing 55, the sixth face being constituted by a cover 66 occupying the last face. The cover 66 is fastened to the shell 64 by means of two screws 68. The assembly is made leaktight by a gasket 70 (FIG. 3). The housing 55 serves to eliminate any exchange of radiation between the inside and the outside of the housing, in particular because the cover 66 is pressed plane-on-plane against the shell 64.

The cover 66 incorporates two connectors 56A and 58, and on the side opposite from the cover 66, the face 72 of the housing 55 supports the connector 56B.

Figure 2:
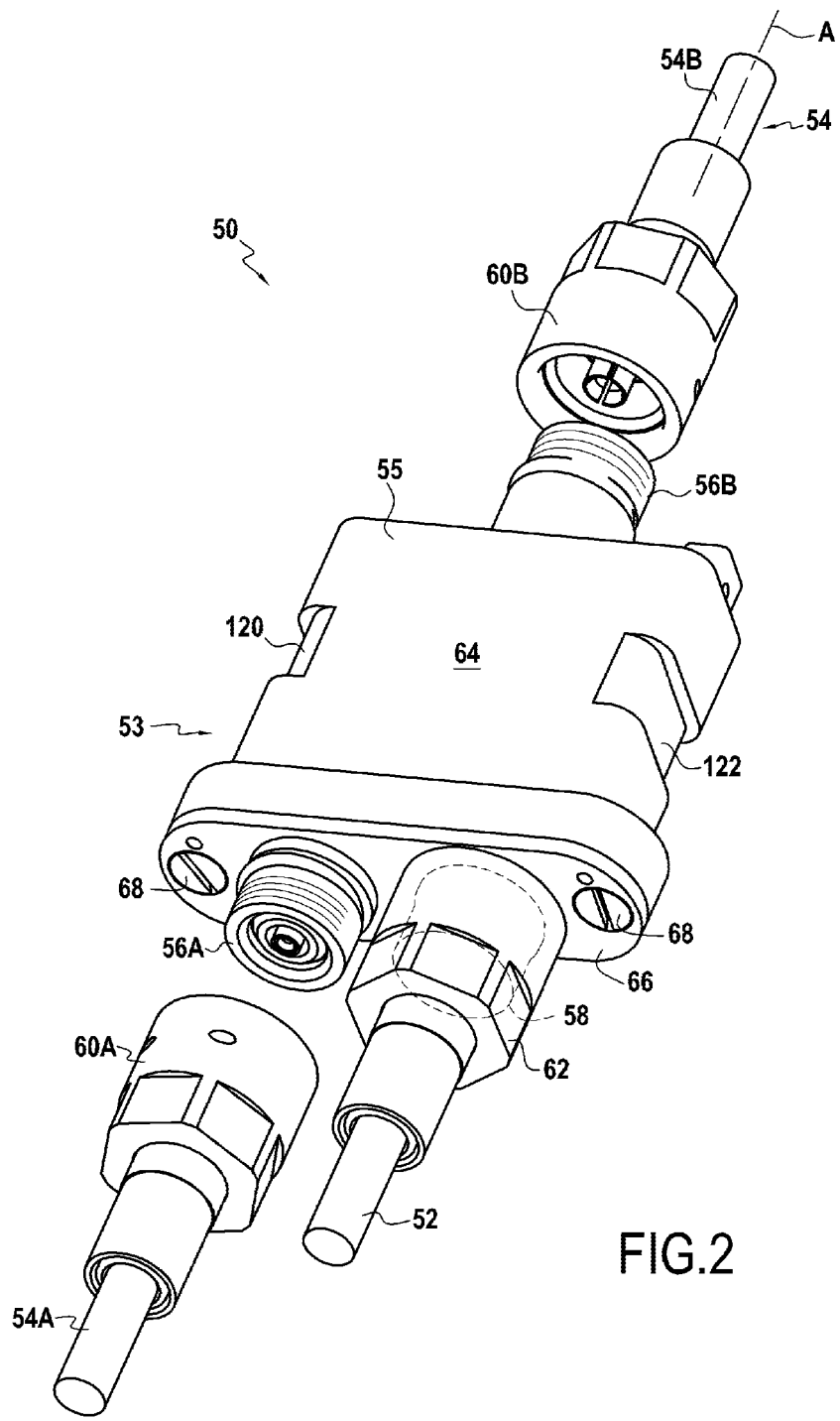
FIG. 2 is a diagrammatic perspective view of a coupling device forming part of a cable portion of the invention.

The cover 66 and the face 72 are parallel and the connectors are perpendicular to these faces, so the two parts 54A and 54B of the databus line and also the subscriber line 52 (more generally the subscriber lines) are all connected to the device parallel to a common direction. This direction is substantially the direction of the line 54 (axis A in FIG. 2), i.e. the direction perpendicular to the cover 66 and to the face 72.

Connecting the subscriber line(s) in the same direction as the databus line via only two opposite faces 66 and 72 of the housing 55 makes it easier to incorporate subscriber lines, thus making it possible with the coupling device 50 to make up a cable portion that is compact and of small bulk.

Furthermore, if traction is exerted on one of the parts 54A, 54B of the line 54, or on the subscriber line 52, this traction acts along the axis of the line 54 via the shielding; for each of the connectors 56A, 56B, and 58, and also for the housing 55, the traction is thus transmitted along their axes. The connectors and the housing thus present great strength against axial traction, whereas conversely they are not very suitable for transmitting a bending moment while maintaining leaktight fastening. Thus, by connecting the various lines in parallel to the housing 55, even when such traction is exerted on the databus line and/or on the subscriber line(s), it is ensured that the housing 55 remains leaktight.

Since the three connectors 56A, 56B, and 58, and also the corresponding connection terminals, are substantially identical, only the connector 56B and the connection terminal 60B corresponding thereto are described in detail, with reference to FIG. 3.

Going from the outside towards the inside (in a radial direction), the connector 56B comprises a cylindrical sleeve 74 made integrally with the housing 55, and having an inside thread at its end; outer insulation 76 in the form of a sleeve; and a coaxial contact 75. The coaxial contact 75 is constituted by a conductive substantially cylindrical sleeve 78, an inner insulating cylindrical sleeve 80, and inside that, an inner conductive hollow rod 82.

The conductive sleeve 78 and the rod 82 are electrically connected (by soldering) to the printed circuit of the coupler 55, as described below.

Likewise, from the outside towards the inside (in a radial direction), the connection terminal 60B comprises:
a conductive grip ring 84;
an outer conductive cylindrical sleeve 86;
an inner insulating cylindrical sleeve 88;
a conductive cylindrical sleeve 90;
an inner insulating cylindrical sleeve 92; and
a conductive rod 94.

The conductive sleeve 90 and the rod 94 are electrically connected by crimping respectively to the two conductors 98 and 99 of the twisted pair constituting the databus line 54. These conductors 98, 99 of the line 54 convey the differential signal as defined in the standard MIL-STD-1553.

Furthermore, the shielding of the line 54 is implemented by crimping onto the outer sleeve 86, and consequently to the grip ring 84.

The connection terminal 60B is mounted on the connector 56B as follows:

The connection terminal 60B is brought up to the connector 56B so as to engage the outer sleeve 90 and put it into electrical contact with the conductive sleeve 78, and so as to engage the rod 94 and put it in contact with the hollow rod 82.

The grip ring 84 is then screwed on, thereby putting the shielding of the portion 54B of the bus line 54 into electrical contact with the housing 55 via the sleeve 74, and also fastening the line portion 54B to the housing 55.

Finally, it should be observed that the connector 56B and the connection terminal 60B have sealing gaskets, in particular O-rings or shaped gaskets, that enable the line portion 54B to be connected in leaktight manner with the housing 55. This prevents any water penetrating into the housing 55 via the connector 56B (and by extension via any of the connectors).

Figure 5:
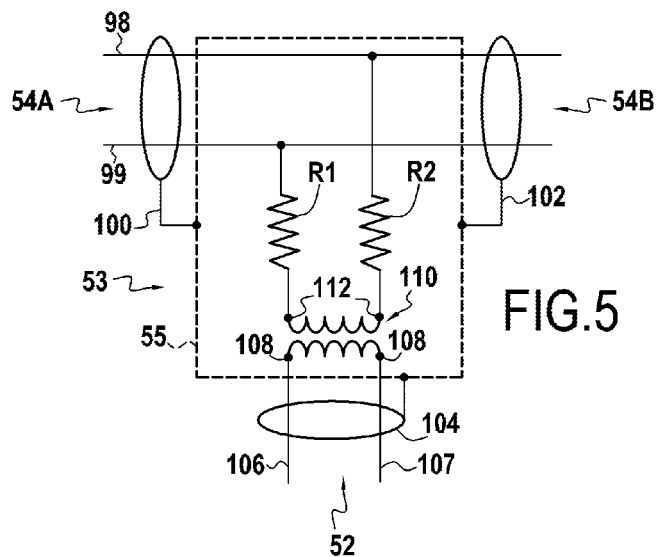
FIG. 5 is an electrical circuit diagram showing a coupler of a coupling device forming part of a cable portion of the invention.

The electrical operation of the coupler 53 is shown in FIG. 5.

Figure 1:
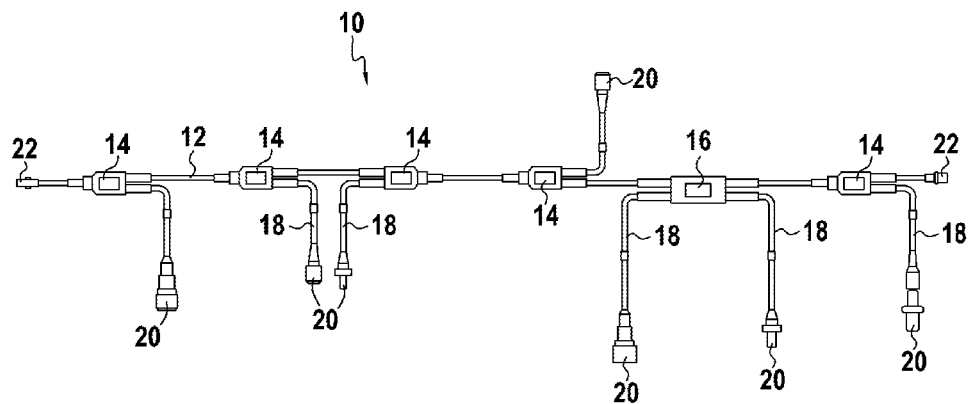
FIG. 1 is a diagrammatic view of a databus network in a prior art embodiment, as described above.
Figure 4:
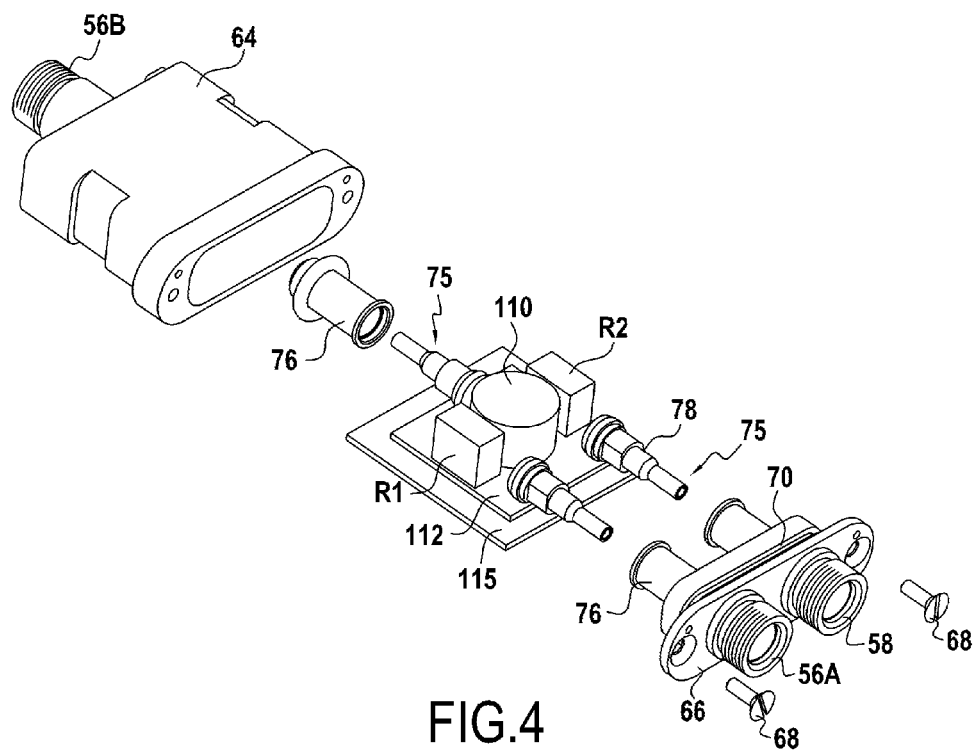
FIG. 4 is an exploded perspective view of the coupling device of FIGS. 2 and 3.

The two conductors 98 and 99 constituting the twisted pair of the bus line 54 are represented diagrammatically by two parallel lines in FIG. 4, showing that the conductors 98 and 99 are connected together between the connectors 56A and 56B via the coupler 53.

The conductive housing 55 (dashed line in FIG. 5) is connected by electrical connections 100, 102, 104 with the shielding of the parts 54A and 54B of the line 54, and with the shielding of the subscriber line 52.

Finally, the two conductors 106 and 107 of the subscriber line 52 are connected to the output terminals 108 of a voltage transformer 110. The input terminals 112 thereof are connected respectively to the conductors 98 and 99 via protective resistors R1, R2 that provide protection against short circuits. The transformer makes it possible to generate a voltage signal from which information is derived or transmitted between the databus line 54 and the subscriber line 52. The standard MIL-STD-1553B specifies values for the resistors R1, R2 and for the coupling transformer 110.

The transformer 110 and the resistors R1 and R2 are mounted on a printed circuit board (PCB) 112 (FIG. 3). For each subscriber line, a coupling device of the invention conventionally comprises a transformer and two resistors. In generally, these components (resistors, transformer) are mounted on a printed circuit. A common printed circuit may be used for the electrical circuit needed for connecting a plurality of subscriber lines.

The coupler 53 is electrically insulated from the housing 55 by means of an in insulating plate 115, onto which the PCB 112 is fastened, the plate physically separating the coupler 53 from the housing 55.

All of the electrical or electronic components arranged inside the housing 55 are components of very small dimensions. Thus, the housing (including the connector) presents a length of less than 50 mm and a weight of less than 50 g (in practice it presents a weight of less than 30 g when the housing is for connecting only one subscriber line).

Because of its very low weight, it has been possible to verify that the coupling device described complies completely with the requirements of the standard MIL-STD-1553B, and in particular that it satisfies the vibration tests and the impact-resistance tests defined by the standards EN3567 and EN2591.

For a coupling device designed for a plurality of subscriber lines, in one embodiment, the device has at least one transformer arranged on a first side of the printed circuit and at least one transformer arranged on a second side of that printed circuit, opposite from the first side. (The resistors are generally also arranged on both sides of the printed circuit.) That said, it is also possible to arrange both transformers on the same side of the printed circuit.

With the structure and the operation of the coupling device of the invention described above, there follows a description of certain ways of fastening it in a vehicle.

Figure 6:
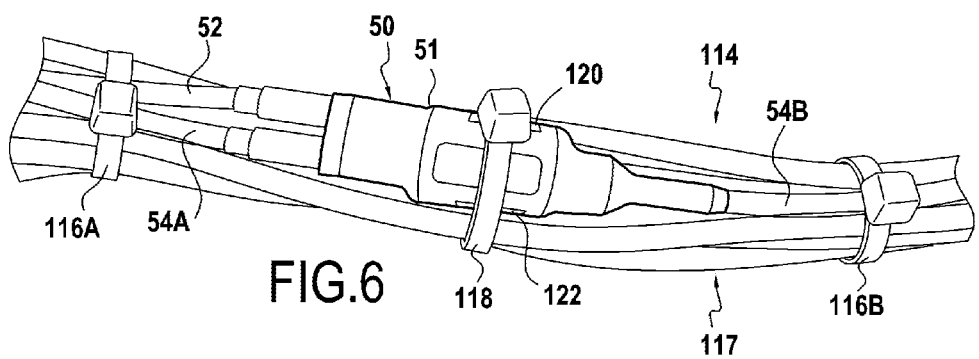
FIG. 6 is a diagrammatic view showing a cable portion of the invention in a first embodiment.
Figure 7:
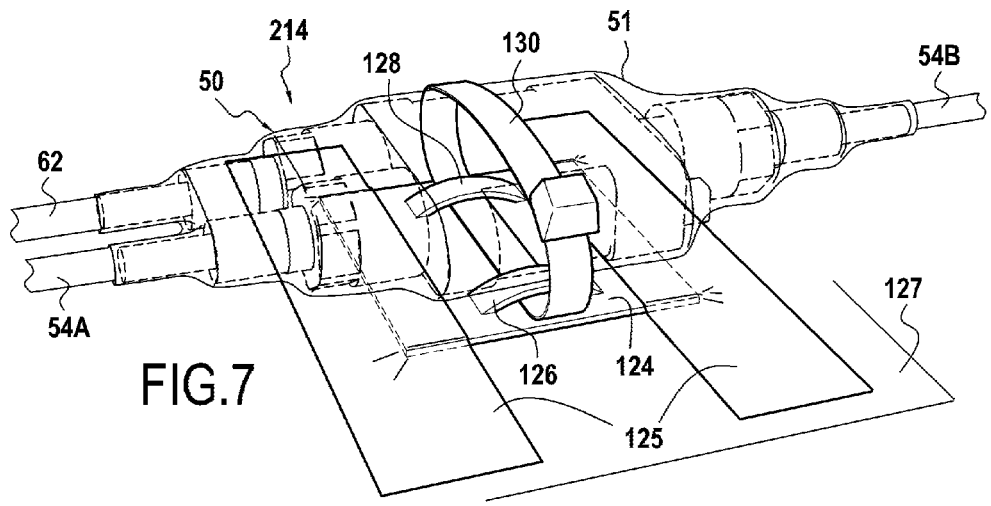
FIG. 7 is a diagrammatic view showing a cable portion of the invention in a second embodiment.

FIGS. 6 and 7 show a cable portion 111 of the invention.

The cable portion 111 has two parts 54A and 54B of the databus line 54, a part of the subscriber line 52, and the coupling device 50 that connects the subscriber line 52 to the databus line 54. In this assembly, the device 50 and the connection terminals of the line 54 and of the subscriber line 52 are protected by a heat-shrink sheath 51.

Three embodiments of a cable portion of the invention having different techniques for fastening the device 50 are envisaged:

In a first fastening technique (FIG. 6), the coupling device 50 is fastened on a cable portion 114 as follows:

Firstly, the line 54 is fastened to the cable bundle 114 by two tie-wrap type fastener collars 116A and 116B that are wrapped around both the line 54 and the other lines 117 of the cable portion. The collars 116A and 116B are arranged on either side of the device 50.

In its heat-shrink sheath, the device 50 is fastened to the cable bundle 114 by means of a fastener collar 118. This extends in a plane that is substantially perpendicular to the general direction of the line 54 and of the cable bundle 114. It surrounds simultaneously the coupling device 50 and the other lines 117 of the cable portion 114.

In order to hold the fastener collar 118 in its relative position on the coupling device 50, the housing 55 also has an outer groove—and specifically two outer grooves 120 and 122—provided for the fastener collar 118. Advantageously, the collar 118 is received in these grooves 120, 122 that are arranged in the shell 64 of the device 50 (see FIG. 2). These grooves ensure that the housing 55 cannot escape from the fastener collar 118, in particular when they are subjected to vibration.

In a second embodiment, if the mechanical stresses (in particular vibration and acceleration) to which the device is subjected make this possible, the device 50 is merely fastened by the lines (parts 54A, 54B of the line 54; subscriber line 62) that are connected thereto—and also to a very small extent by its housing 55 pressing against the other cables of the bundle 114—. This technique is identical to that shown in FIG. 6, except that there is no fastener collar 118.

Finally, a third embodiment of a cable portion 214 of the invention is shown in FIG. 7. Unless specified to the contrary, the characteristics of this cable portion 214, and in particular the fastening of the coupling device 50, are analogous to the corresponding characteristics specified for the above-described cable portion 114.

In this embodiment, in the cable portion 214, the device 50 is fastened by using an additional rigid support 124. The support 124 is fastened by means of two strips 125 of adhesive tape on a wall 127 on which it is desired to hold the cable portion 214 in a fixed position. The support 124 is in the form of a square plate, having two loops 126 and 128 through which a collar 130 is passed. In a manner analogous to the collar 118, the collar 130 serves to hold the coupling device 50. Nevertheless, in this embodiment, the fastener collar 130 serves to transmit the stresses to which the coupling device is subjected, not to other lines of the cable portion, but to the support 124, and via the support to the wall 127.

In this embodiment, as in the preceding embodiments, the coupler device 50 is thus held without harming the structure in which the cable portion is incorporated.

The embodiments described have a coupling portion 50 designed to be connected to a single subscriber line. Naturally, a coupler device of the invention may be made so as to enable a plurality of subscriber lines to be connected. Under such circumstances, it is appropriate in particular to provide a printed circuit suitable for receiving in parallel one or more additional circuits similar to that shown in FIG. 5, and one or more additional connectors identical to the connector 60 and connected to the additional circuit(s). The housing should be modified accordingly.

The invention claimed is:

1. A cable portion comprising:
   two portions of a databus line;
   at least one subscriber line portion; and
   a coupling device to which the databus line and at least one subscriber line portion are connected;
   wherein the databus line and the at least one subscriber line each comprise a shielded twisted pair of conductors,
   wherein the coupling device comprises
   in a conductive housing, a coupler for transmitting data between the two portions of the databus line, and also between the databus line and the at least one subscriber line portion; and
   connectors secured to the housing, enabling the two parts of said databus line and the at least one subscriber line portion to be reversibly connected thereto,
   wherein the housing is electrically connected to a shielding of each of the two databus line portions and a shielding of the at least one subscriber line portion, and
   wherein the coupling device weighs less than 70 g and is held with the help of a fastener collar.

2. The cable portion according to claim 1, further comprising at least one other line in addition to the databus line and said at least one subscriber line, and wherein the fastener collar holds together the coupling device and at least one line from said at least one other line.

3. The cable portion according to claim 1, wherein the coupling device weighs less than 50 g.

4. The cable portion according to claim 1, wherein the housing further comprises an outer groove for receiving the fastener collar.

5. The cable portion according to claim 1, wherein the two databus line portions and the at least one subscriber line portion are connected to the coupling device in parallel with a common direction.

6. The cable portion according to claim 1, wherein the coupling device further comprises a printed circuit;
   at least one transformer arranged on a first side of said printed circuit; and
   at least one transformer arranged on a second side of said printed circuit, opposite from the first side.

7. The cable portion according to claim 1, further comprising a rigid support on which the coupling device is fastened by at least one fastener collar.

8. The cable portion according to claim 1, wherein the connectors and said coupler of the coupling device are miniaturized for weight reduction.

9. The cable portion according to claim 1, wherein the coupling device is mechanically supported solely by the above-mentioned lines, directly and/or via at least one fastener collar.

10. The cable portion according to claim 1, wherein one of the data line or subscriber line portions extends to communications equipment, and
    wherein, the coupling device is mechanically supported by an external support piece by bearing against the support piece or by being adhesively bonded thereto.

11. The cable portion according to claim 10, further comprising a rigid support to which the coupling device is fastened by at least one fastener collar, the rigid support being fastened to the support piece by adhesive bonding and/or by adhesive tape.

12. A cable portion comprising:
    two portions of a databus line;
    at least one subscriber line portion; and
    a coupling device to which the databus line portions and at least one subscriber line portion are connected,
    wherein the databus line and the at least one subscriber line each comprise a shielded twisted pair of conductors,
    wherein the coupling device comprises
    in a conductive housing, a coupler for transmitting data between the two portions of the databus line, and also between the databus line portions and the at least one subscriber line portion; and
    connectors secured to the housing, enabling the two portions of the databus line and the at least one subscriber line portion to be reversibly connected thereto,
    wherein the housing is electrically connected to a shielding of each of the two databus line portions and a shielding of the at least one subscriber line portion,
    wherein the coupling device weighs less than 70 g and is held with the help of a fastener collar, wherein the cable portion comprises at least one other line portion in addition to the two databus line portions and the at least one subscriber line portions, wherein the fastener collar holds together the coupling device and the at least one other line portion, and wherein the coupling device is mechanically supported solely by one or more of the two databus line portions, the at least one subscriber line portion, or the at least one other line portion, directly and/or via at least one fastener collar.

13. The cable portion according to claim 12, wherein the coupling device weighs less than 50 g.

14. The cable portion according to claim 12, wherein the housing further includes an outer groove for receiving the fastener collar.

15. The cable portion according to claim 12, wherein the two portions of the databus line and the at least one subscriber line portion are connected to the coupling device in parallel with a common direction.

16. The cable portion according to claim 12, wherein the coupling device further comprises a printed circuit, at least one transformer arranged on a first side of said printed circuit, and at least one transformer arranged on a second side of said printed circuit, opposite from the first side.

* * * * *